United States Patent [19]

Feller

[11] Patent Number: 5,772,389
[45] Date of Patent: Jun. 30, 1998

[54] COMBINED DUMP TRUCK AND SPREADER APPARATUS

[75] Inventor: Richard L. Feller, Monroe, Wis.

[73] Assignee: Monroe Truck Equipment Inc., Monroe, Wis.

[21] Appl. No.: 717,511

[22] Filed: Sep. 20, 1996

[51] Int. Cl.⁶ ........................................................ B60P 1/36
[52] U.S. Cl. ........................... 414/489; 414/469; 414/528; 414/502; 239/657; 239/672; 239/676; 296/184
[58] Field of Search ............................ 414/469, 507, 414/489, 527, 528, 502; 298/17 R, 23, 22 R, 24, 25, 26, 27; 239/650, 657, 672, 676; 296/184

[56] References Cited

U.S. PATENT DOCUMENTS

| | | | |
|---|---|---|---|
| Re. 25,709 | 1/1965 | Swenson | 414/528 |
| 1,805,489 | 5/1931 | Kerr et al. | 296/184 |
| 2,233,111 | 2/1941 | Roberts | 414/489 |
| 2,577,310 | 12/1951 | Connelly | 414/528 |
| 2,697,609 | 12/1954 | Chase et al. | 414/528 |
| 2,988,368 | 6/1961 | Kerr | 414/528 |
| 3,179,272 | 4/1965 | Goldberger | 298/36 X |
| 3,300,068 | 1/1967 | Tarrant, Sr. | 414/528 |
| 3,317,066 | 5/1967 | Hamm | 414/528 |
| 3,377,030 | 4/1968 | Swenson | 414/528 |
| 3,498,486 | 3/1970 | Freeman, Jr. | 414/528 |
| 3,583,646 | 6/1971 | Bogenschutz | 239/672 |
| 4,056,283 | 11/1977 | Pow | 239/657 X |
| 4,157,150 | 6/1979 | Hetrick | 414/502 X |
| 4,266,731 | 5/1981 | Musso | 239/676 |
| 4,773,598 | 9/1988 | Jones | 414/489 X |
| 4,886,214 | 12/1989 | Musso, Jr. et al. | 414/489 X |
| 4,925,356 | 5/1990 | Snead et al. | 414/528 |
| 4,995,773 | 2/1991 | Lamoureux et al. | 414/528 |
| 5,286,158 | 2/1994 | Zimmerman | 414/528 |
| 5,437,499 | 8/1995 | Musso | 414/528 X |
| 5,466,112 | 11/1995 | Feller | 414/528 |

FOREIGN PATENT DOCUMENTS

| | | | |
|---|---|---|---|
| 2546115 | 11/1984 | France | 414/528 |
| 2658765 | 8/1991 | France | 414/527 |
| 958573 | 9/1982 | U.S.S.R. | 239/657 |
| 1283130 | 1/1987 | U.S.S.R. | 414/489 |

OTHER PUBLICATIONS

Usemco Rock Box (no date or place of publication listed).
All purpose body Swenson Feb. 13, 1995.
Air–Flo multi–Purpose Oct. 1, 1991.
APB All Purpose Body Swenson Spreader Oct. 1995.

*Primary Examiner*—Frank E. Werner
*Attorney, Agent, or Firm*—David J. Archer

[57] ABSTRACT

A combined dump truck and spreader apparatus is disclosed for selectively dumping and spreading materials. The apparatus includes a truck chassis and a body for receiving and dispensing the materials. The body has a first and a second end and a first and second curved side wall. The body is secured to the chassis and a tailgate is secured to the first end of the body. A conveyor is disposed within the body and extends between the first and second ends thereof for conveying the materials along the body. The tailgate defines an opening which co-operates with the conveyor for permitting the flow therethrough of the materials. The arrangement is such that selective spreading and dumping of the materials from the opening is permitted.

12 Claims, 4 Drawing Sheets

COMBINED DUMP TRUCK AND SPREADER APPARATUS

BACKGROUND OF THE INVENTION

1. Field of the Invention

The present invention relates to a combined dump truck and spreader apparatus for selectively dumping and spreading materials. More specifically, the present invention relates to a combined dump truck and spreader apparatus for spreading salt and sand and the like on roadways.

2. Information Disclosure Statement

In a typical prior art spreader apparatus, a V-box type spreader is mounted within the body of a dump truck.

The aforementioned V-Box spreader includes a longitudinally extending conveyor disposed adjacent to the base of the V-box. The arrangement is such that the conveyor conveys materials along the V-box towards the back of the truck in a controlled manner. The materials which typically include sand and salt are dispensed by the conveyor through a guide chute and are dispersed by means of a rotary spinner which spreads the materials across the roadway being treated. However, such V-box spreaders have certain inherent disadvantages. More particularly, in adverse weather conditions with ice and snow covering a roadway, a problem exists when there is insufficient traction between the truck carrying the V-box spreader and the road.

Various relatively complex arrangements have been proposed in order to supply a quantity of sand and salt ahead of the rear wheels of the truck in order to increase the traction thereof.

Another problem with the prior art arrangements is that the considerable capacity of a typical dump truck body is not utilized when fitted with a V-box spreader.

Accordingly, the present invention provides a unique combination of a dump truck and a spreader.

In its basic concept, the present invention includes a truck body having a conveyor means disposed at the base of the dump body which is of a generally semi-circular cross sectional configuration. The conveyor means conveys the materials selectively through a rear opening or a front aperture for spreading thereof. Additionally, the materials can be dumped through a tail gate at the rear end of the dump body.

The present invention provides an apparatus that not only permits the dispensing of sand and salt from the rear of the truck for normal spreading operations but also provides means for spreading the materials ahead of the rear wheels thereby enhancing the traction thereof.

Furthermore, in the present invention, the apparatus enables the rapid unloading of the materials from the truck body by a dumping operation which includes hoisting the dump body so that the materials flow from the body past the tailgate.

Also, the aforementioned hoisting is accomplished by means of a hoist cylinder disposed between the dump body and the cab. In a preferred embodiment of the present invention, the cylinder is located in front of the dump body so that the customary dog box for the reception of the cylinder is not required. Additionally, the forward location of the hoist permits the centrally disposed conveyor to extend forwardly through the front end of the dump body for permitting spreading in front of the rear wheels to increase traction in icy conditions.

According to the present invention, the combined unit is able to move safely, economically and quickly, thereby allowing the user thereof to spread sand, salt or a variety of other products without having to raise or tilt the body or add additional equipment to perform the aforementioned functions.

Additionally, the apparatus according to the present invention doubles as a regular dump truck without having to remove bulky add-on spreading equipment.

The aforementioned apparatus according to the present invention permits spreading of the materials with up to four spinners. The conveyor runs forward or backward thereby allowing the dumping of materials to the rear only or front only. Such an arrangement allows the operator to spread sand mixed with salt ahead of the drive tires for traction on slippery surfaces or when going up steep hills or inclines.

On most prior art front discharge sander spreaders, it is necessary to raise the body forward or tilt the body sideways to accomplish front spreading. Such forward or sideways tilting introduces safety problems because changing either the vertical or horizontal center of gravity tends to make the truck less stable.

Also, when the body of the prior art truck arrangement is raised for spreading, there exists the danger of hitting trees, bridges, powerlines and the like.

The apparatus according to the present invention enables complete operation and control of the spreading and dump modes so that the apparatus can be converted from the spreading mode to the dumping mode from inside the cab. Most prior art arrangements having front discharge spreaders make it necessary for the operator to go outside the cab in order to change a series of levers and latches to convert the apparatus.

Also, with the apparatus according to the present invention, the center of gravity is lower than with the prior art V-box spreader arrangement. The dump body according to the present invention has a greater capacity than the capacity of a V-box spreader mounted on a dump body because with the V-box spreader, the walls thereof are inclined at 45 degrees whereas with the dump body according to the present invention, the walls are curved, thereby increasing the capacity thereof.

Also, the curved side walls of the semi-circular dump body according to the present invention, guide the materials contained therein towards the centrally disposed conveyor.

Furthermore, usually in the prior art arrangements, the V-box spreader is located in the truck body and thus the truck is designated for long periods as a spreader unit only with no dump capability.

In essence, the apparatus according to the present invention permits spreading to the front or rear with a better center of gravity, with less weight and more capacity while easily converting to a dump mode.

U.S. Pat. No. 5,466,112 to the Applicant of the present application enables simultaneous delivery of materials to both the front and rear of the dump body. However, the dump body according to the present invention achieves most of the advantages of the arrangement disclosed in the U.S. Pat. No. 5,466,112 while avoiding the cost incurred by the provision of two conveyors.

Therefore, the primary objective of the present invention is to provide a combined dump truck and spreader apparatus that overcomes the aforementioned inadequacies of the prior art arrangements and which makes a considerable contribution to the art of dumping materials from a truck and for spreading sand, salt and the like materials on a roadway to the front or rear.

Other objects and advantages of the present invention will be readily apparent to those skilled in the art by a consideration of the detailed description contained hereinafter taken in conjunction with the annexed drawings.

SUMMARY OF THE INVENTION

The present invention relates to a combined dump truck and spreader apparatus for selectively dumping and spreading materials. The apparatus includes a truck chassis and a dump body for receiving and dispensing the materials. The body has a first and a second end and a first and a second side wall. The body is secured to the chassis and a tailgate is secured to the first end of the body.

A conveyor means is disposed centrally within the body. The conveyor means extends between the first and second ends of the body for conveying the materials along the body.

The tailgate defines an opening which cooperates with the conveyor means for permitting the flow therethrough of the materials. The arrangement is such that selective spreading or dumping of the materials through the opening is permitted.

The dump body is semi-circular in cross section and defines a first and second side wall. The walls curve downwardly and inwardly towards the conveyor means for guiding the materials towards the conveyor means.

The body is secured about a pivotal axis which extends normal to the conveyor means. Also, the tailgate is secured to the first end of the body about a further pivotal axis which is disposed spaced and parallel to the pivotal axis. The arrangement is such that when the tailgate is in a closed disposition thereof the materials are contained within the body. However, when the tailgate is pivoted about the further pivotal axis to an open disposition thereof, dumping of materials from the body past the tailgate is permitted.

Additionally, hoist means for dumping extend between the body and the chassis for selectively pivoting the body about the pivotal axis such that when the tailgate is disposed in the open disposition, dumping of the materials is permitted.

The tailgate extends from the first to the second side wall of the body. Additionally, the tailgate has a top and a bottom edge with the further pivotal axis being disposed adjacent to the top edge of the tailgate.

Also, the tailgate includes locking means for releasably locking the tailgate in the closed disposition thereof.

The hoist means includes a hoist cylinder which is disposed between the cab and the dump body. Preferably, the cylinder of the hoist means is positioned forward relative to the dump body.

The conveyor means includes a first and second chain. The chains are disposed spaced and parallel relative to each other between the side walls and parallel thereto. A plurality of material moving slats are disposed such that each slat extends between the chains.

A first sprocket means co-operates with the chains and is disposed adjacent to the first end of the body for guiding the chains.

A second sprocket means co-operates with the chains and is disposed adjacent to the second end of the body for guiding the chains.

Drive means are connected to at least one of the sprocket means for driving the conveyor means.

More specifically, the drive means includes a drive motor which is associated with either the first or the second sprocket means.

Also, means such as a gearbox, direct drive or another type of transmission is operatively connected between the drive motor and associated sprocket means. The arrangement is such that movement of the conveyor means for moving the materials in either directions between the ends of the body is permitted. The tailgate also includes deflector means secured to a bottom edge of the tailgate for deflecting the materials within the body towards the conveyor means. The deflector means includes a gate means for selectively controlling the flow of materials through the first opening.

Additionally,, the second end of the body defines an aperture. The aperture co-operates with the conveyor means for permitting the flow therethrough of the materials. The arrangement is such that selective spreading of the materials through the opening or aperture is permitted so that when the materials flow through the aperture, spreading of the materials from the second end of the body is permitted for increasing the traction of the combined apparatus.

Many modifications and variations of the present invention will be readily apparent to those skilled in the art by a careful consideration of the detailed description contained hereinafter taken in conjunction with the annexed drawings. However, such modifications and variations fall within the spirit and scope of the present invention as defined by the appended claims. Included in such modifications would be the provision of a hydraulic motor for driving the conveyor means. Also, the present invention envisages the provision of a variable speed motor so that rapid dumping of the materials through the opening is permitted.

Also, although specific dumping means are disclosed herein, any arrangement for raising the body could be used including those hoists endorsed by the National Truck Equipment Association for performing within specified performance ranges for particular truck body dimensions.

The present invention provides a multitude of combinations each suitable for a particular application. For example, the present invention includes an arrangement in which no hoist is provided for the dump body and in which the materials can alternatively be spread or dumped through the opening or aperture.

BRIEF DESCRIPTION OF THE DRAWINGS

Similar reference characters refer to similar parts throughout the various views of the drawings.

DETAILED DESCRIPTION OF THE DRAWINGS

Figure 1:
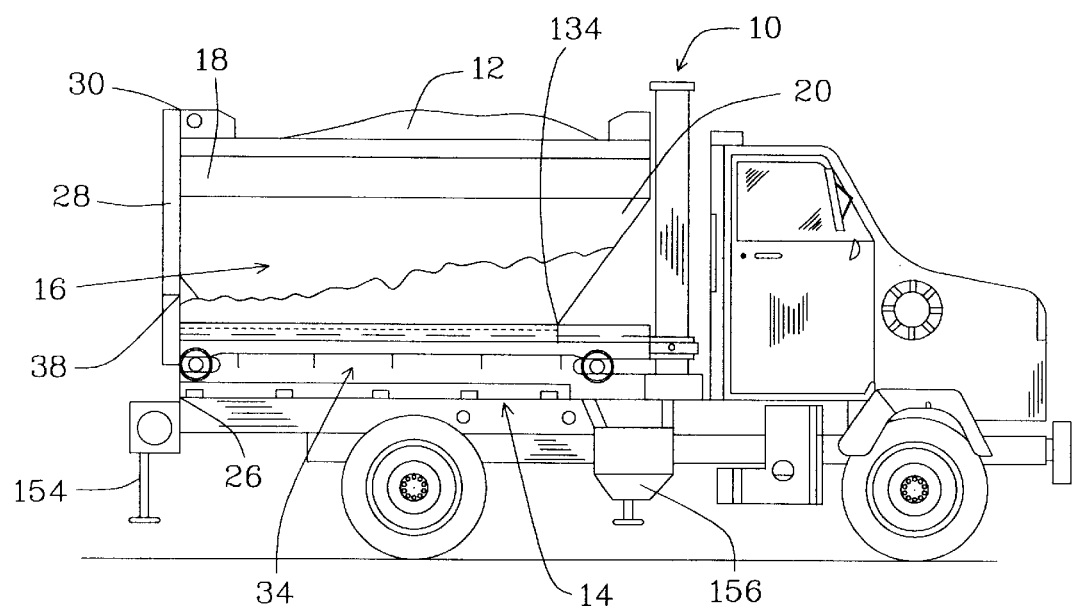
FIG. 1 is a side elevational view of a combined dump truck and spreader apparatus according to the present invention.

FIG. 1 is a side elevational view of a combined dump truck and spreader apparatus generally designated 10 according to the present invention for selectively dumping and spreading materials 12.

The apparatus 10 includes a truck chassis generally designated 14 and a dump body generally designated 16 for receiving and dispensing the materials 12. The body 16 has a first and second end 18 and 20 respectively, that is a rear end 18 and a front end 20. The body 16 also includes a first and second side wall 22 and 24 respectively particularly as shown in the plan view of FIG. 3. The body 16 is secured to the chassis 14 about a pivotal axis 26 which extends normal to the length of the dump body particularly as shown in FIGS. 2 and 3.

A tailgate 28 is secure to the first end 18 of the body 16 about a further pivotal axis 30 which is disposed spaced and parallel relative to the pivotal axis 26. The arrangement is such that when the tailgate 28 is in a closed disposition thereof as shown in FIG. 1, the materials 12 are contained within the body 16.

Figure 2:
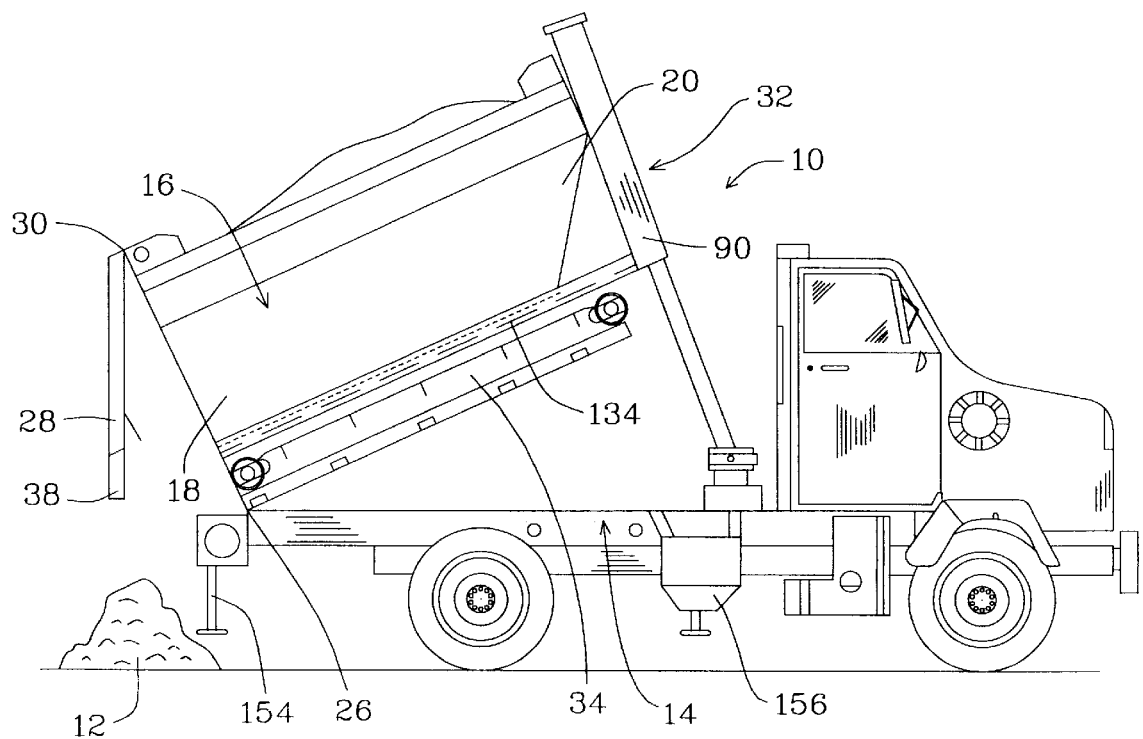
FIG. 2 is a similar view to that shown in FIG. 1 but shows the body raised so that the materials may be dumped therefrom.
Figure 3:
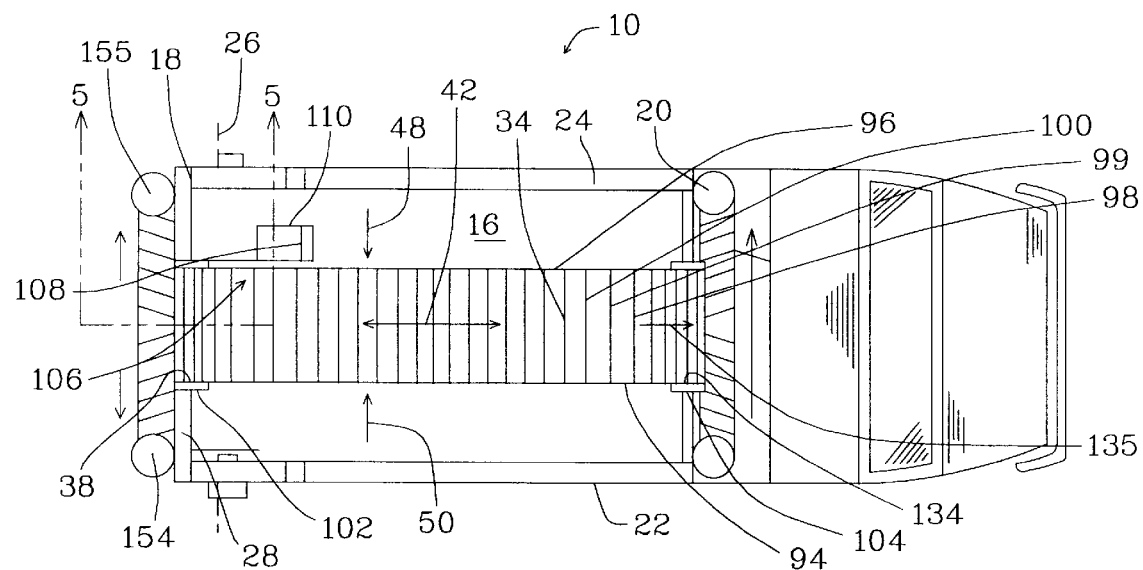
FIG. 3 is a top plan view of the combined dump truck and spreader apparatus shown in FIG. 1 with the materials removed therefrom to show the conveyor means.

However, when the tailgate 28 is pivoted about the further pivotal axis 30 to an open disposition thereof as shown in FIG. 2, dumping of the materials 12 from the body 16 past the tailgate 28 is permitted.

FIG. 2 is a similar view to that shown in FIG. I but shows the body 16 in the raised position thereof for dumping materials 12 from the body 16.

More specifically, FIG. 2 shows hoist means generally designated 32 extending between the body 16 and the chassis 14 for selectively pivoting the body 16 about the pivotal axis 26. The arrangement is such that, when the tailgate 28 is disposed in the open disposition thereof as shown in FIG. 2, dumping of the materials 12 is permitted.

FIG. 3 is a top plan view of the apparatus 10 shown in FIG. 1. FIG. 3 shows conveyor means 34 disposed within the body 16 and extending between the first and second ends 18 and 20 of the body 16 for conveying materials 12 along the body 16.

Figure 4:
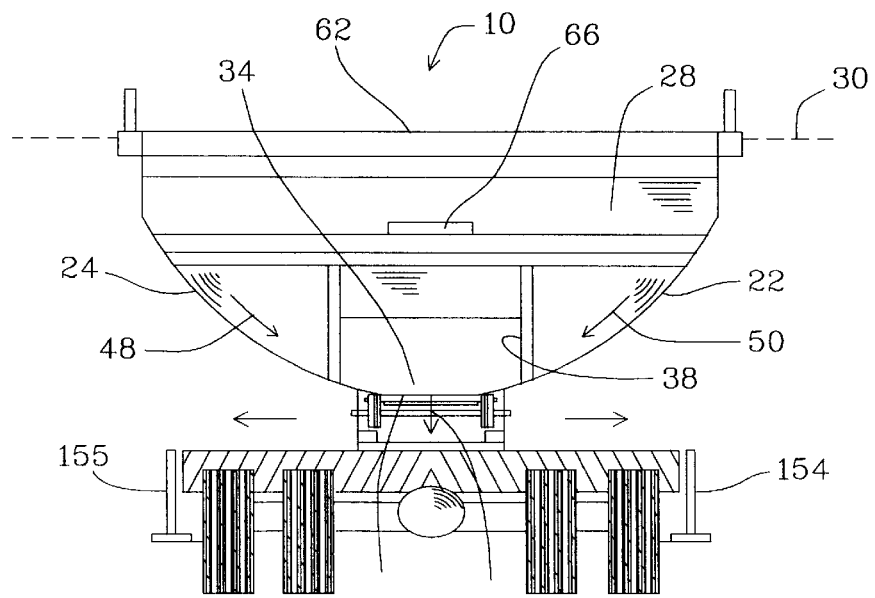
FIG. 4 is a rear view of the apparatus shown in FIG. 1.

FIG. 4 is a view of the rear of the apparatus 10 shown in FIG. 1. FIG. 4 shows the tailgate 28 defining an opening 38. The opening 38 co-operates with the conveyor means 34 for permitting the flow therethrough as indicated by the arrow 42 of the materials 12. The arrangement is such that selective spreading of the materials 12 through the opening 38 is permitted.

The sloping side walls 22 and 24 guide the materials 12 towards the conveyor means 34 as indicated by the arrows 48 and 50.

The curved side walls 22 and 24 of the body 16 as shown in FIGS. 3 and 4 are disposed substantially parallel and spaced relative to each other with the conveyor means 34 disposed therebetween.

The tailgate 28 extends from the first to the second side wall 22 and 24 respectively of the body 16 as shown FIGS. 3 and 4. Also, as shown in FIG. 4, the tailgate 28 has a top and a bottom edge 62 and 64 respectively. The further pivotal axis 30 is disposed adjacent to the top edge 62 of the tailgate 28.

The tailgate 28 includes locking means generally designated 66 for releasably locking the tailgate 28 in the closed disposition thereof as shown in FIGS. 1, 3 and 4.

The hoist means 32 includes hydraulic cylinder means 90 shown in FIG. 2 which extends between the chassis 14 and the dump body 16 with the hydraulic cylinder means 90 being disposed preferably forwardly relative to the dump body 16 so that the conveyor means 34 extends through the second end 20 of the dump body 16 with sufficient clearance between the cylinder 90 and the conveyor means 34 to permit unimpeded hoisting of the dump body 16.

FIG. 3 shows the conveyor means 34 including a first and second chain 94 and 96. The chains 94 and 96 are disposed spaced and parallel to each other between the side walls 22 and 24 of the body 16.

A plurality of materials slats 98, 99, and 100 are arranged such that the slats 98 to 100 extend between the chains 94 and 96.

A first sprocket means 102 co-operates with the chains 94 and 96 and is disposed adjacent to the first end 18 of the body 16 for guiding the chains 94 and 96.

A second sprocket means 104 co-operates with the chains 94 and 96 and is disposed adjacent to the second end 20 of the body 16 for guiding the chains 94 and 96.

Figure 6:
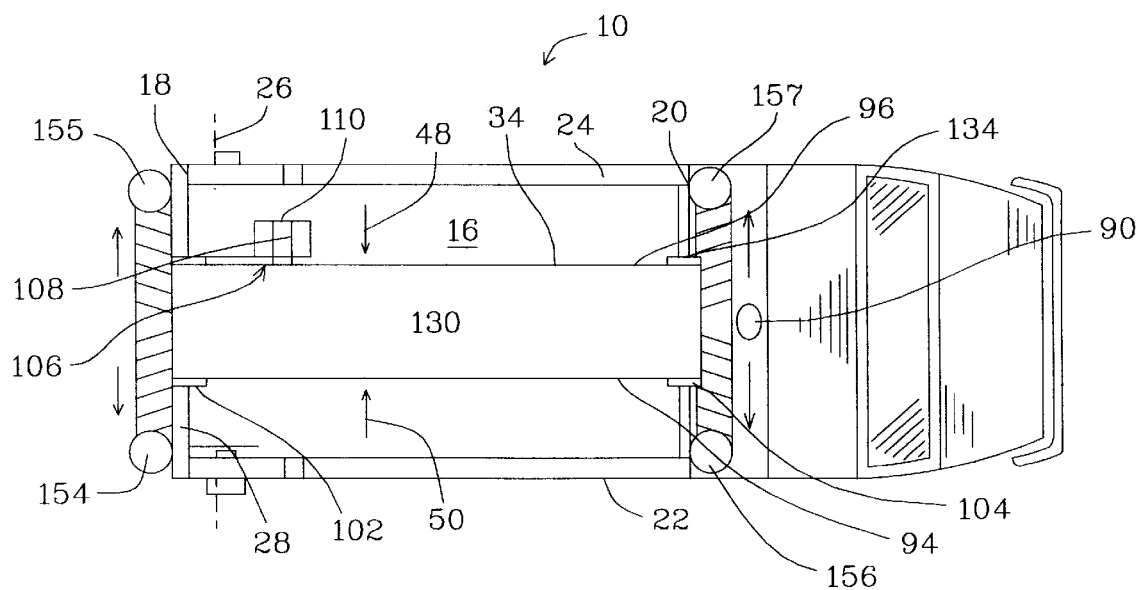
FIG. 6 is a similar view to that shown in FIG. 3 but shows a removable cover on the conveyor means.

Drive means generally designated 106 are connected to at least one of the sprocket means 102, 104 for driving the conveyor means 34. More specifically, as shown in FIGS. 3 and 6, the drive means 106 includes a drive motor 108 which is associated with either the first or second sprocket means 102 and 104.

Additionally, a gear box 110 is operatively connected between the drive motor 108 and associated sprocket means 102 or 104. The arrangement is such that movement of the conveyor means 34 for moving the materials 12 in either direction as indicated by the arrow 42 between the ends 18 and 20 of the body 16 is permitted.

Also, as shown in FIGS. 1 and 3, the second end 20 of the body 16 also defines an aperture 134. The aperture 134 co-operates with the conveyor means 34 for permitting the flow therethrough of the materials 12 as indicated by the arrow 135. The arrangement is such that selective spreading of the materials 12 through either the opening 38 or aperture 134 is permitted so that when the materials 12 flow through the aperture 134, spreading of the materials 12 from the second end 20 of the body 16 is permitted for increasing the traction of the combined apparatus 10.

Figure 5:
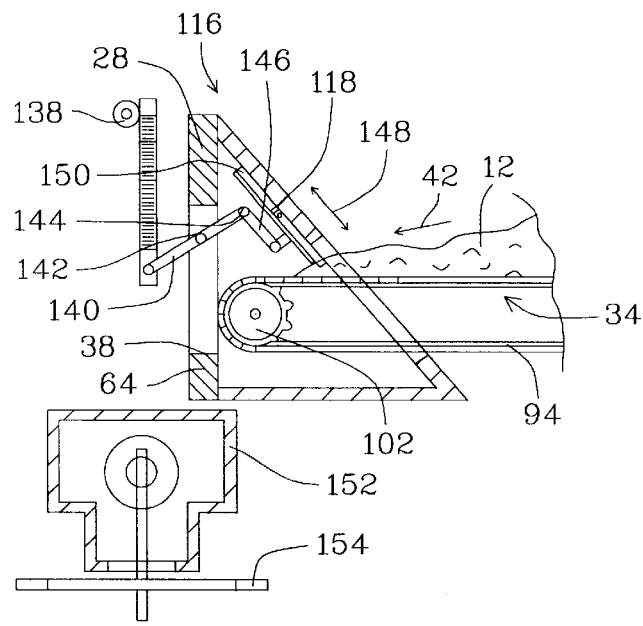
FIG. 5 is an enlarged sectional view taken on the line 5—5 of FIG. 3.

FIG. 5 is an enlarged sectional view taken on the line 5—5 of FIG. 3. FIG. 5 shows the tailgate 28 as also including deflector means generally designated 116 rigidly secured to the bottom edge 64 of the tailgate 28 for deflecting the materials 12 within the body 16 towards the conveyor means 34.

As shown in FIG. 5, the deflector means 116 includes a gate means 118 for selectively controlling the flow of materials 12 as indicated by the arrow 42 through the opening 38.

FIG. 5 also shows means for adjusting a gate 118. A screw jack arrangement 138 is adjustable in a vertical direction for pivoting lever 140 about a pivot 142. A crossbar 144 is secured at the opposite end of the lever 140 relative to the screw jack 138. The crossbar 144 via links 146 causes the gate 118 to slide within guide 150 as indicated by the arrow 148. By adjusting the position of the gate 118, the flow of materials for spreading is regulated.

FIG. 6 is a similar view to that shown in FIG. 3 but shows additionally the body 16 as further including a removable cover 130 slidably received on the conveyor means 34. The arrangement is such that when the conveyor means 34 is inoperative, the cover 130 prevents the flow of materials 12 onto the conveyor means 34.

Those skilled in the art will appreciate that various control arrangements can be used in order to control the driving of the conveyor means 34. Also, the movement of the gate 118 can be controlled remotely as is well known in the art.

As shown in FIG. 5 of the drawings, a single auger type dispenser 152 is used at the rear of the truck with spinners 154 and 155 under the tailgate 28 as shown in FIG. 6.

Figure 7:
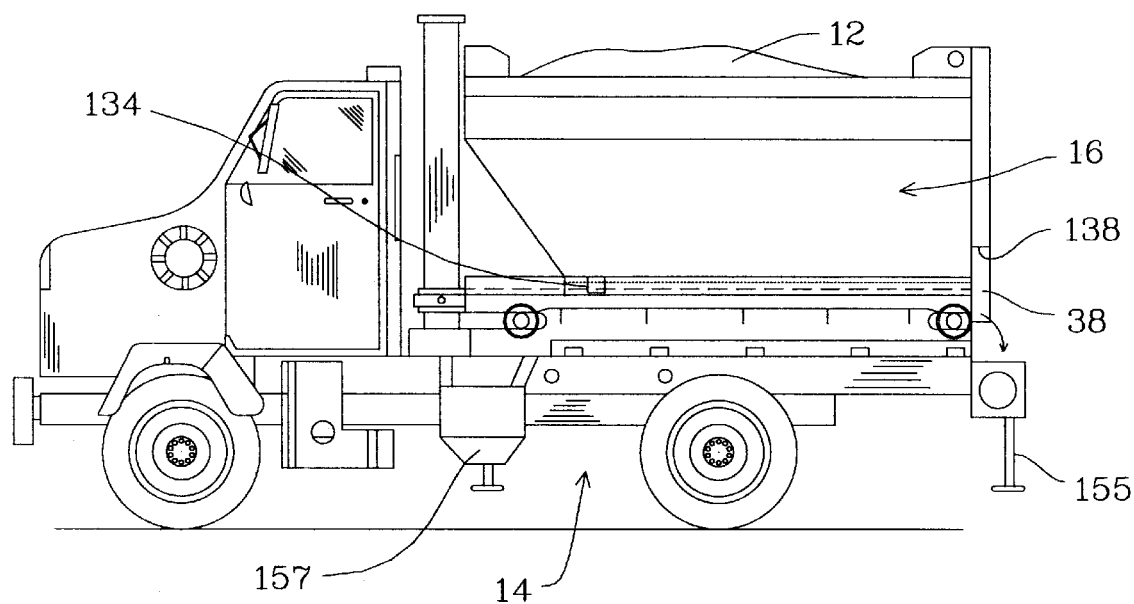
FIG. 7 is a similar view to that shown in FIG. 1 but shows the opposite side of the apparatus.

FIG. 7 is a view similar to that shown in FIG. 1 but shows the opposite side of the truck. As shown in FIG. 7, in a preferred embodiment of the present invention, spinners 156 and 157 are located on either side of aperture 134 as particularly shown in FIGS. 6 and 7.

In operation of the apparatus, materials 12 are loaded into the body 16. Normally, the materials are fed through the opening 38 so that spreading by spinners 154 and 155 is accomplished. However, if traction difficulties are encountered on an incline, conveyor means 34 is reversed so that sand and salt are spread through aperture 134 ahead of the rear tires towards spinners 156 and 157.

When the truck is required for moving materials, the hoist means 32 is operated remotely from within the cab when the locking means 66 has been released also from within the cab so that the load is dumped.

Also, if blacktop is being transported, cover 130 can be installed in order to prevent clogging of the sprocket and chain mechanism.

The present invention provides a combined dump truck and spreader apparatus in which materials can be quickly dumped from a body through the tailgate. Alternatively, the materials can be spread on both sides of the truck by the conveyor means either behind the truck or ahead of the truck in order to increase traction in adverse weather conditions.

What is claimed is:

1. A combined dump truck and spreader apparatus for selectively dumping and spreading materials, said apparatus comprising:

a truck chassis;

a dump body for receiving and dispensing the materials, said body having, a first and a second end and a first and a second side wall, said body being pivotally secured to said chassis about a pivotal axis;

hoist means extending between said body and said chassis for selectively pivoting said body about said pivotal axis;

a tailgate pivotally secured to said first end of said body about a further pivotal axis for selectively permitting dumping of the materials therethrough when said body is pivoted about said pivotal axis;

endless conveyor means trained over drive means, said conveyor means being disposed at a bottom of said walls and within said body and extending between said first and second ends thereof for conveying the materials along said body;

spreader means cooperating with said conveyor means for spreading the materials;

said tailgate defining an opening which co-operates with said conveyor means for permitting the flow therethrough of the materials, the arrangement being such that selective spreading and dumping of the materials from said opening is permitted; and said side walls curving downwardly and inwardly towards said conveyor means such that said dump body defines a substantially semi-circular cross sectional configuration for guiding and evenly deflecting all of the materials within said body towards said conveyor means along the entire length of said conveyor means.

2. A combined dump truck and spreader apparatus as set forth in claim 1 wherein said tailgate has a top and a bottom edge, said tailgate further including:

deflector means secured to said bottom edge of said tailgate for deflecting the materials within said body towards said conveyor means;

said deflector means including:

a gate means for selectively controlling said flow of materials through said opening.

3. A combined dump truck and spreader apparatus as set forth in claim 2 wherein said tailgate extends from said first to said second side wall of said body, said further pivotal axis being disposed adjacent to said top edge of said tailgate.

4. A combined dump truck and spreader apparatus as set forth in claim 1 wherein said pivotal axis extends normal to said side walls.

5. A combined dump truck and spreader apparatus as set forth in claim 4 wherein said further pivotal axis is disposed spaced and parallel to said pivotal axis such that when said tailgate is in a closed disposition thereof, the materials are contained within said body and when said tailgate is pivoted about said further pivotal axis to an open disposition thereof, dumping of the materials from said body past said tailgate is permitted.

6. A combined dump truck and spreader apparatus as set forth in claim 5 wherein said tailgate includes:

locking means for releasably locking said tailgate in said closed disposition.

7. A combined dump truck and spreader apparatus as set forth in claim 1 wherein said side walls of said body are disposed substantially parallel and spaced relative to each other.

8. A combined dump truck and spreader apparatus as set forth in claim 1 wherein said conveyor means includes:

a first and second chain, said chains being disposed spaced and parallel relative to each other between said side walls of said body;

a plurality of materials moving slats, each slat extending between said chains;

a first sprocket means drivingly co-operating with said chains and disposed adjacent to said first end of said body for guiding said chains;

a second sprocket means drivingly co-operating with said chains and disposed adjacent to said second end of said body for guiding said chains;

said drive means operably connected to at least one of said sprocket means for driving said conveyor means.

9. A combined dump truck and spreader apparatus as set forth in claim 8 wherein said drive means includes:

a drive motor associated with at least one of said first and second sprocket means;

means operatively connected between said drive motor and associated sprocket means, the arrangement being such that movement of said conveyor means for moving the materials in either direction between said ends of said body is permitted.

10. A combined dump truck and spreader apparatus as set forth in claim 1 wherein said side walls guide the materials downwardly towards said conveyor means, the arrangement being such that when the materials are received within said body, said walls deflect the materials towards said conveyor means.

11. A combined dump truck and spreader apparatus as set forth in claim 1 wherein said body further includes:

a removable cover slidably received on said conveyor means, the arrangement being such that when said conveyor means is inoperative, said cover prevents the flow of the materials onto said conveyor means.

12. A combined dump truck and spreader apparatus as set forth in claim 1 wherein said second end of said body defines an aperture which co-operates with said conveyor means for permitting the flow therethrough of the materials, the arrangement being such that selective spreading of the materials through said aperture is permitted so that when the materials flow through the aperture, spreading of the materials from said second end of said body is permitted for increasing traction of said combined apparatus.

* * * * *